United States Patent
Kreitmair-Steck et al.

(10) Patent No.: US 9,116,029 B2
(45) Date of Patent: Aug. 25, 2015

(54) OPTICAL LIQUID LEVEL SENSOR HAVING A PLURALITY OF OPTICAL FIBERS

(71) Applicant: AIRBUS HELICOPTERS DEUTSCHLAND GMBH, Donauworth (DE)

(72) Inventors: Wolfgang Kreitmair-Steck, Munich (DE); Frank Singer, Sauerlach (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 162 days.

(21) Appl. No.: 13/937,533

(22) Filed: Jul. 9, 2013

(65) Prior Publication Data
US 2014/0014777 A1 Jan. 16, 2014

(30) Foreign Application Priority Data

Jul. 11, 2012 (EP) .................................... 12400025

(51) Int. Cl.
*G01F 23/284* (2006.01)
*B64D 37/00* (2006.01)
*G01F 23/292* (2006.01)

(52) U.S. Cl.
CPC .......... *G01F 23/2845* (2013.01); *B64D 37/005* (2013.01); *G01F 23/2921* (2013.01); *G01F 23/2927* (2013.01)

(58) Field of Classification Search
CPC combination set(s) only.
See application file for complete search history.

(56) References Cited

U.S. PATENT DOCUMENTS

| | | | |
|---|---|---|---|
| 3,535,933 A | 10/1970 | Pliml, Jr. | |
| 3,844,171 A | 10/1974 | Rodger | |
| 4,134,022 A | 1/1979 | Jacobsen | |
| 4,373,389 A | 2/1983 | Decker | |
| 5,723,870 A * | 3/1998 | Crowne et al. | 250/577 |
| 5,802,728 A | 9/1998 | Karnick et al. | |
| 6,172,377 B1 * | 1/2001 | Weiss | 250/577 |
| 7,710,567 B1 | 5/2010 | Mentzer et al. | |
| 2004/0021100 A1 | 2/2004 | Gouzman et al. | |

FOREIGN PATENT DOCUMENTS

| | | |
|---|---|---|
| DE | 3235591 A1 | 3/1984 |
| DE | 4204212 A1 | 8/1993 |
| DE | 102008042254 A1 | 4/2010 |
| DE | 102008064019 A1 | 7/2010 |
| DE | 102009029099 A1 | 3/2011 |
| EP | 0152644 A2 | 8/1985 |
| EP | 1533598 A1 | 5/2005 |
| WO | 2010051806 A1 | 5/2010 |

OTHER PUBLICATIONS

Search Report and Written Opinion; Application No. EP 12400025.8; dated Dec. 18, 2012.

* cited by examiner

*Primary Examiner* — Francis M Legasse, Jr.
(74) *Attorney, Agent, or Firm* — Brooks Kushman P.C.

(57) ABSTRACT

An optical level sensor mounted to a ceiling of a tank includes a sensor tube. The sensor tube is provided with support and guidance elements extending with at least three radially distributed positions inside the tank. The support and guidance elements collect, support, and guide optical fibers to different heights of the tank. Each optical fiber has a number of input sides and a number of turns forming sensor heads between two input sides, for a different level. The corresponding support and guidance element bends the fiber in the turns forming sensor heads of a small radius r around at least one corresponding guideway.

20 Claims, 6 Drawing Sheets

OPTICAL LIQUID LEVEL SENSOR HAVING A PLURALITY OF OPTICAL FIBERS

CROSS-REFERENCE TO RELATED APPLICATIONS

This application claims priority to European application No. 12 400025.8 filed on Jul. 11, 2012, the disclosure of which is incorporated in its entirety by reference herein.

BACKGROUND OF THE INVENTION (1) Field of the Invention

The invention is related to an optical liquid level sensor.

(2) Description of Related Art

Precise sensing of the level of liquids in tanks or containers is important for different reasons: prevention of overfilling of tanks, computation of the actual liquid consumption, identification of low liquid level, etc. From a safety point of view, it is even more important to know the exact level for tanks with inflammable liquids such as fuel. It is therefore necessary to control the filling and consuming processes as well as determining the current level if filling or consuming is to be started. Especially with inflammable liquids it is furthermore important for safety reasons to reduce or to eliminate all kind of electricity from inside the tank or container. It is important to avoid any kind of spark or ignition source inside the area/space of the liquid. Furthermore, in cases of liquid level sensors in a tank/container for aircrafts or vehicles it is important to design the liquid level sensor in such a way, that the components satisfy the crash requirements and that the liquid level sensor in case of a crash does not cause any damage to the tank/container, even if the tank/container is made of soft material.

The document U.S. Pat. No. 7,710,567 describes determining the density and/or temperature of a fluid in a tank, based on the optical energy affected as it propagates across a gap between opposing end faces of optical waveguides. A housing includes a cylindrical body, a top portion and a bottom portion. The top and bottom portions are secured to the body by fasteners. A conduit is positioned in a volume within the housing. The top and bottom portions each have a through hole formed therein. The through holes are aligned with a passage defined by the conduit. The through holes permit the fluid in the tank to enter. Legs are attached to the bottom portion to a bottom surface of the tank. A plurality of sources of optical energy are in optical communication with an associated one fiber optic cables, e.g. light-emitting diodes having emission in the visible green wavelength. Also, each light detector is e.g. a photo detector sensitive in the visible green wavelength.

The document US 2004/0021100 describes fiber optic measuring of levels of fluid. An ordered array of multiple optical fibers contains each a single sensitive element located on a specific level within the range of fluid level change. Each single sensitive element transmits different light signal, depending on either the sensitive element is immersed or located above the level of liquid. The making of optical contact of the fiber is with cladding disposed from the tank bottom with the fiber without cladding disposed from the top at a certain level of the range of liquid levels By removing a section of cladding near the end of the fiber the latter is equipped with a fluorescent element at its end. The fibers are connected to a common reflective mirror or a fluorescent element at the bottom of a housing. A bundle of optical fibers is disposed along a holder with the sensitive sections distributed along the holder. In side cross-sectional view, the U-shaped sensitive sections are of different types formed by e.g. a fiber without cladding or isolation, however with metallic cover or cladding at the lower part of U-shape or loop. Receiving parts of the fibers form a feedback bundle of fibers guiding the light signals to the light detector. The light signals modulated in frequency domain are detected by a single light detector which transforms them in current/voltage signals.

The document U.S. Pat. No. 3,844,171 describes a liquid level indicator having a probe which is inserted within a container holding the liquid, and an external readout device. A unit includes a connector end which holds coupling lines by means of a clamp, into a middle section which holds a sensing device axially extended therefrom. The sensing device is a hollow tube from glass or plastic with the middle section having one end thereof knurled for manipulating and the other end with a screw thread to connect the unit to a holder, permanently attached to the top of the container. The probe contains a vertical prism and pairs of light guides spaced at preselected levels along the prism. The light guides are spaced from the prism. In an elevation sectioned view of the unit, the sensing device is mounted on a retaining member located adjacent a notch longitudinally cutting a section of the wall of the tube. Part of the middle section is having an external thread thereon to permit attaching the unit on the container for permanent connection. The tube needs not be transparent. The fiber optics continues from the upper section in a semicircular arrangement around the tube.

The document WO2010051806 discloses an optical sensor arrangement for detecting a first liquid medium in a second liquid medium by means of reflection of an emitted light beam at a wavelength, with a light source and an associated receiver, wherein two round glass rod lenses which are encapsulated in a housing are arranged parallel to one another. The glass rod lenses have an optical refractive index which is different from that of the liquid media. A reflection surface which is connected to the housing is arranged opposite the glass rod lenses. There is also a control device having a beam splitter, a second receiver and a third receiver which are arranged opposite one another. This sensor is suited only for measuring whether the liquid has reached a certain predefined level or not, but it is not suited for continuous measurements of varying levels. This sensor is therefore especially useful as a low level or maximum level sensor, but it cannot provide information e.g. for computing the consumption.

The document U.S. Pat. No. 4,134,022 discloses a level sensing apparatus having a source for supplying a signal having a predetermined frequency, a level sensor connected to the source and having an output for supplying an output signal having the predetermined frequency as long as the material, the level of which is being sensed, is not at a predetermined level. The level sensing apparatus further has a frequency sensitive circuit for receiving the output signal from the level sensor and for providing an output whenever the frequency of the signal is above or below the predetermined frequency, and a load which is connected to be responsive to the output from the frequency sensitive circuit. The level sensing apparatus is only capable to determine whether the liquid has reached a predefined level or not. Even the extension of the basic concept to several sensors is limited in its use, because it can only determine whether the liquid in one of the tanks has reached the respectively defined level or not. It is not possible to determine the exact level of the liquid.

The document U.S. Pat. No. 3,535,933 discloses a liquid level indicator in which a plurality of depending parallel light transmitting rods having different lengths are adjacently positioned, but maintained physically separated substantially throughout the entire longitudinal extent thereof. The upper portions of each of the light rods are interconnected and spaced apart by a flange section which in turn is clamped to the liquid container. The lower portions of the rods are integrally connected by a separator element between the rods and the upper portions provided an exposed liquid level indicating surface. The lower extremities of the light rods are positioned in the liquid and define a conical tip having an included angle of 90° for receiving light rays from and reflecting light rays to the upper indicating surface. The liquid level indicator needs a plurality of elongated members or rods and each of them needs a respective sensing unit. In order to provide the required stability, these members or rods need to be massive and have therefore significant weight. In addition, the light source and the light measuring device need to be positioned on the same end of the members or rods.

The document EP1533598 discloses a fiber optic level measurement device for use with transparent liquids in containers. Said fiber optic level measurement device has at least one optical fiber that is at least partially immersed in the liquid with the liquid level determined from the difference between injected light intensity and exiting light intensity. An input leg of the optical fiber has a spiral shape which extends to the lowest level of the container, while the output leg of the fiber is straight. Only one fiber measures the level of liquid based on the amount of refraction in the liquid. Therefore the measurement and the comparison of the light intensities of the input light and the output light needs to be very precise in order to determine the liquid level. Respective devices for measuring the light intensity need to be calibrated very precisely and are fairly expensive. Furthermore, the resolution of the sensor is limited due to the measuring principle.

The document DE3235591 discloses a fiber-optic liquid-level display device with a first optical fiber, assigned to a light source, and a second optical fiber, assigned to a light detector. The two optical fibers are coupled via a fiber coupler to a third optical fiber and a fourth optical fiber. The third optical fiber and the fourth optical fiber reach with their ends to different depths into the vessel containing the liquid to be measured. Depending on the level, the light at the ends of the optical fibers is coupled out or reflected and fed to the photodiode, with the result that the level range of the liquid can be detected by means of the current of said photodiode. The teaching of DE3235591 allows a reduction of the number of components needed, but it increases the requirements for the photo diode significantly, since it needs to discriminate the exact light intensity. The more different levels are to be detected, the more difficult is the realization of this sensor. This is therefore limited with respect to the achievable resolution.

Capacitive sensors as proposed in documents DE102008064019, DE102008042254 or DE102009029099 suffer from the disadvantage that electricity has to be transmitted into the container/tank which is not desirable, especially for sensing the level of inflammable or explosive liquids. In addition, most capacitive probes contain metal probes and therefore tend to be in conflict with the crash requirements.

For preparing the application, the following prior art documents were considered: DE102008064019 KOSSIRA 2008; DE102008042254 ROESSLER 2008; DE102009029099 STAMMLER 2009; DE3235591 SPENNER 1982; DE4204212 WITTKOWSKI 1992; EP0152644 MULDER 1983; EP1533598 SCHNELL 2003; U.S. Pat. No. 3,535,933 PLIML 1969; U.S. Pat. No. 3,844,171 RODGER 1971; U.S. Pat. No. 4,134,022 JACOBSEN 1976; U.S. Pat. No. 4,373,389 DECKER 1979; U.S. Pat. No. 5,802,728 KARNICK 1995; U.S. Pat. No. 7,710,567 MENTZER 2006; US 2004/021100 GOUZMAN 2002 and WO2010051806 WILDSHUTZ 2008.

BRIEF SUMMARY OF THE INVENTION

The object of the invention is to provide an optical liquid level sensor for determination of the exact level of a liquid in a container or tank, especially an optical liquid level sensor for a container or tank in a vehicle, such as an aircraft. For instance, this aircraft is a rotary wing aircraft.

The solution is provided with an optical liquid level sensor according to the features of claim 1.

According to the invention an optical level sensor for detection of liquid levels is mounted to a container or tank. The optical level sensor comprises a light source, a light detector with a processing unit and at least one optical fiber with one input side of it assigned to the light source and reaching from the light source into said container or tank, and at least one output side assigned to the light detector and reaching from inside said container or tank to the light detector. A tube is provided with support and guidance elements which collect and guide all of the at least one optical fibers into or out of the tank/container. Preferably 50, 100, 200, 1000 or any number of optical fibers in between are provided in order to allow for detection of 50, 100, 200 or 1000 liquid levels. Each optical fiber is very small in dimension with typical diameters between 0.1 mm and 1.0 mm and embedded into a separate support and guidance elements made of plastic or metal. Each optical fiber is linked to detection of a specific liquid level.

The sensing of the light detector is such that if the light intensity of the light input communicated by the output optical fiber to the light detector is below a certain threshold $I_c$, the processing unit identifies the light to be off, i.e. the environment of the support and guidance element with the respective fiber is surrounded by liquid. If the light intensity is above the critical level $I_c$, the processing unit interprets it as surrounded by air, i.e. outside the liquid. Depending on the exact optical characteristics, especially the refractive index of the liquid, the diameter and the material of the fiber as well as the number of small turns of the fiber, such as 1-20 turns with radii <10 mm, are defined in a way that due to the specific refractive indices of the fiber material and the liquid the light remains inside the respective fiber, if there is no liquid at the location of the corresponding support and guidance element, whereas enough light is leaving the fiber and entering the liquid, if the fiber is exposed to the liquid at the location of the corresponding support and guidance element. Advantages of the invention are:

An optical liquid level sensor according to the present invention allows for a continuous sensing of the liquid level in a container/tank with a very high resolution without introducing electricity into the container/tank with the liquid;

Despite the high resolution, the light source and the sensing electronics are very compact and simple;

The inventive sensor is based on modular components and easy to assemble;

Due to the possibility to use plastics or plastics skeletons for the sensor tube, it can easily be made crash worthy/crash tolerant; and Because of the multitude of sensor elements it is possible to provide for self-monitoring of the inventive sensor, e.g. by applying plausibility checks for the results of consecutive sensor elements.

According to a preferred embodiment of the invention the input sides and the output sides of the optical fibers are collected in groups respectively.

According to a further preferred embodiment of the invention the collection of input sides/ends of the fibers is fed collectively by a homogeneous planar light source.

According to a further preferred embodiment of the invention the collection of output sides of the fibers are sensed collectively by a Charged Coupled Device (CCD) as light detector.

According to a further preferred embodiment of the invention the optical fibers are made of glass or plastic.

According to a further preferred embodiment of the invention the optical fibers have a diameter between 0.1 mm and 1.0 mm.

According to a further preferred embodiment of the invention the support and guidance elements are made of plastic or metal.

According to a further preferred embodiment of the invention 50, 100, 200, 1000 or more sensor head elements are assembled.

According to a further preferred embodiment of the invention each optical fiber is guided in its half-length through its support and guidance element which is bending the fiber with a small radius <10 mm around one or several guideways of said guidance element. The optical fibers are designed to reflect all of the light input or almost all of the light input inside the optical fiber to conduct said light input to the output end of the optical fiber, when the bent parts are in contact with air, whereas a large portion of the light is emitted to the liquid, when the bent parts of the optical fibers are in contact with the liquid.

According to a further preferred embodiment of the invention a reference optical fiber is used to provide a reference for the light intensity from an optical fiber which is exclusively in air.

According to a further preferred embodiment of the invention spacing elements and a spiral spring are provided, the support and guidance elements and spacing elements being compressed with the spiral spring in order to guarantee the density of the elements.

According to a further preferred embodiment of the invention the optical fibers can be arranged outside the fiber collecting tube with the optical fibers being more or less unprotected.

According to a further preferred embodiment of the invention the support and guidance elements including the optical fibers can be completely inside a caging basket.

According to a further preferred embodiment of the invention the transparent input window is an optical filter in order to reduce the light intensity or to increase the light discrimination level.

BRIEF DESCRIPTION OF THE SEVERAL VIEWS OF THE DRAWINGS

Preferred embodiments of the invention are presented in the following description with reference to the attached drawings.

DETAILED DESCRIPTION OF THE INVENTION

Figure 1:
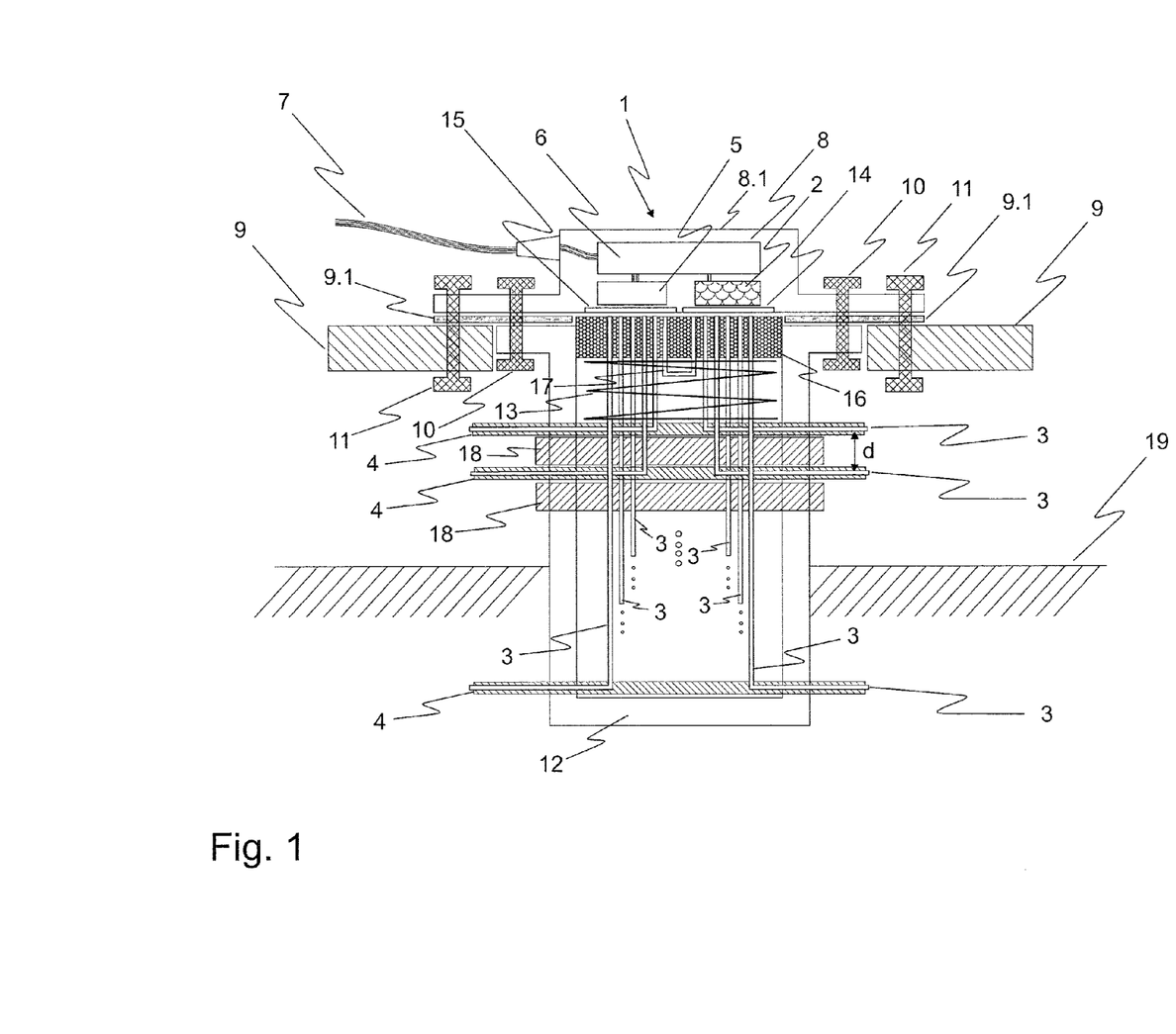
FIG. 1 shows a cross sectional view of an optical liquid level sensor according to the invention.

According to FIG. 1 an optical liquid level sensor 1 is mounted by means of screws or rivets 11 to a ceiling of a liquid container or tank 9 containing a liquid up to a level 19. An interface between tank/container 9 and the optical liquid level sensor 1 is sealed by a sealing element 9.1, made of e. g. elastomer material.

A fiber collecting sensor tube 12 for a multitude of polymeric or glass fibers 3 with respective diameters $d_F$ which are guided at their respective measurement levels through the support and guidance elements 4 is mounted from inside the tank/container 9 by means of screws 10 to a housing 8.1. The support and guidance elements 4 are made of plastic or metal. The support and guidance elements 4 are flat with a height between 0.5 to 3 mm, allowing for a resolution of the liquid level 19 between 0.5 to 3 mm respectively.

If the tank/container 9 for a liquid is 500 mm high and the required resolution of the measurement is 1.5 mm there is a need of 333 fibers 3; the height of each of the support and guidance elements 4 might then be at most 1.5 mm and the diameter of the optical fiber 3 might be 1 mm or less.

Each of the support and guidance elements 4 encompasses one of the fibers 3. Spacing means 18 between said support and guidance elements 4 provide for an intended sensing scale of the liquid level sensor 1. A holding means 16 is provided inside the sensor tube 4 for bundling and guiding the fibers 3 from the support and guidance elements 4 to the interface with the sensor electronics 8. The support and guidance elements 4 guide each of the fibers 3 through one or up to twenty turns at a certain height/level in the tank/container 9. The collection of support and guidance elements 4 and spacing elements 18 are compressed by means of a spiral spring 13.

A sensor electronics 8 is mounted to the housing 8.1. This sensor electronics 8 comprises a processing unit 6, supplied by a combined power and signal line 7. Light is transmitted from a light source 2 inside the electronics housing 8.1 through a transparent output window 14. Another transparent input window 15 is integrated into the housing 8.1 for light reception at the CCD Unit 5 for sensing the received light pattern inside the electronics housing 8.1. The transparent input window 15 can act as an optical filter in order to reduce the light intensity or to increase the light discrimination level.

The individual fibers 3 are fed with homogeneous light from a planar light source, i.e. with light of the same intensity and color for the whole area of the planar light source, as light input 2 of the sensor electronics 8. The light is travelling because of total reflection at fiber walls through the fibers 3 without much distortion, i.e. with less than 25% of loss of initial light intensity at the input side in the fiber until the support and guidance elements 4. During the way of the light along the liquid/non-liquid environment of the support and guidance element 4 the amount of reflection depends on the presence of liquid. The intensity of the return light sensed at the optical output with the light detector as CCD Unit 5 of the sensor electronics 8 is reduced, if the part of the fiber 3 which is guided in the support and guidance element 4 is exposed to the liquid.

A reference for the light intensity of the light input 2 at normal, unaffected transmission in the fibers 3 is provided by a reference optical fiber 17.

On FIGS. 2-10 corresponding items are referred to with the same reference numbers than similar items on FIG. 1.

Figure 2:
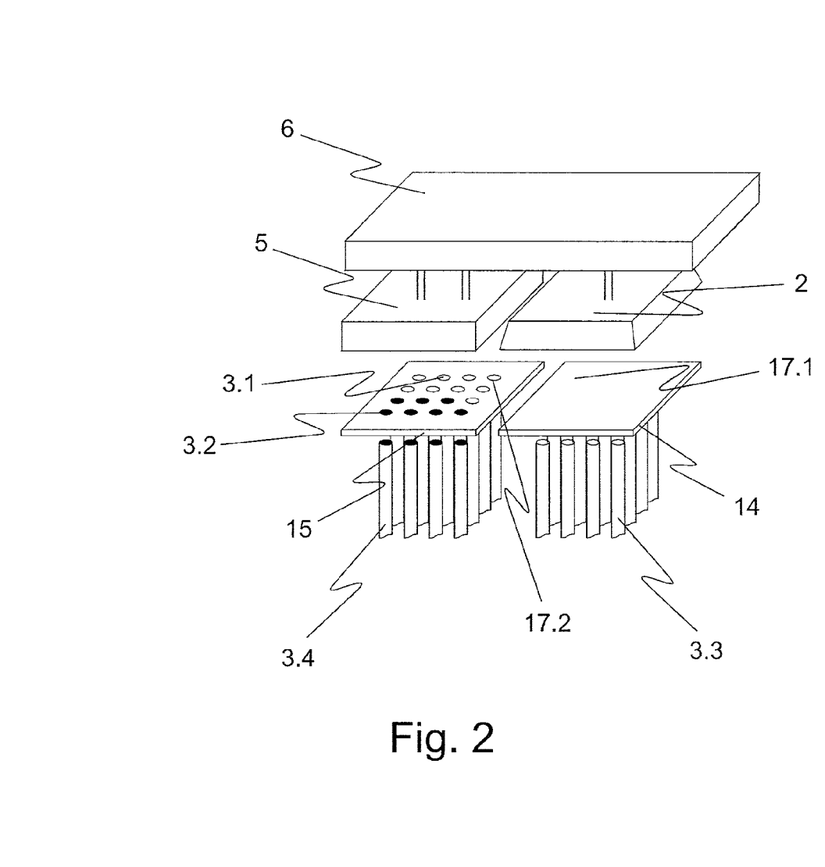
FIG. 2 shows a spherical view of an extract of FIG. 1.

Light is fed from the light input 2 into input sides 3.3 of the fibers 3. The light returned at output sides 3.4 of the fibers 3 is sensed with the CCD Unit 5. With the light input 2 yielding a homogenous illumination of the whole transparent output window 14, a bundle of input sides 3.3 of the fibers 3 is supplied with light of the same intensity and color. The bundle of output sides 3.4 of the fibers 3 projects individual light intensities 3.1 or 3.2 to the transparent input window 15, i.e. spot 3.1 due to light intensities $I \geq I_c$ or spot 3.2 due to light intensities $I < I_c$, said light intensities I depending on the amount of refraction and loss during the travel of the input light through the fibers 3 at the respective support and guidance element 4. The light pattern resulting on the input window 15 is collectively sensed by the CCD Unit 5 and assessed by the processing unit 6.

The transparent output window 14 is provided with an input spot 17.1 for the reference optical fiber 17 and the transparent input window 15 is provided with a measurement spot 17.2 for said reference optical fiber 17 for calibration of light quality and light level.

Figure 3:
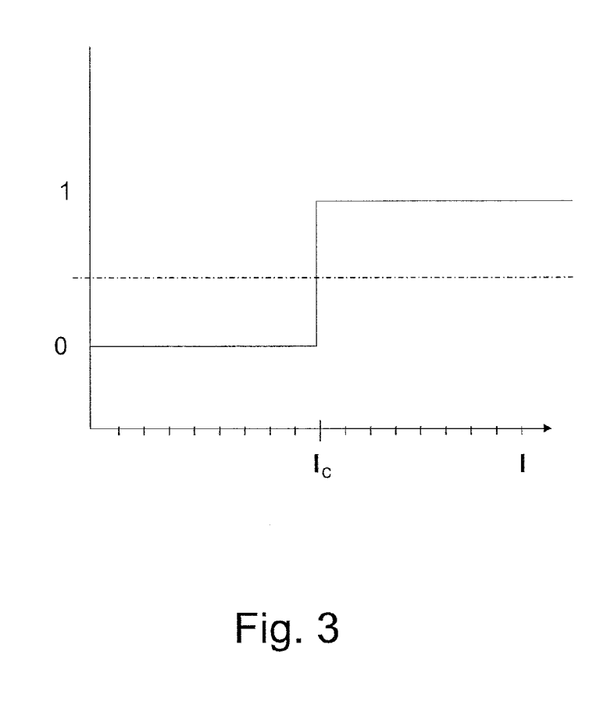
FIG. 3 shows a preferred interpretation function of the optical liquid level sensor according to the invention.

According to FIG. 3, the light intensities of the output ends 3.4 of the fibers 3 are executed with an interpretation function in the processing unit 6. The assumption for said interpretation function is, that at a critical light intensity $I_c$ a distinction is made between two conditions of light transmission: 0 for no transmission and 1 for transmission. A light intensity I below the critical light intensity $I_c$ results in the condition 0 with the interpretation that the support and guidance element 4 with the optical fiber 3 is surrounded by liquid. For condition 1 the interpretation is that the support and guidance element 4 with the optical fiber 3 is outside the liquid inside the container/tank 9.

Figure 4:
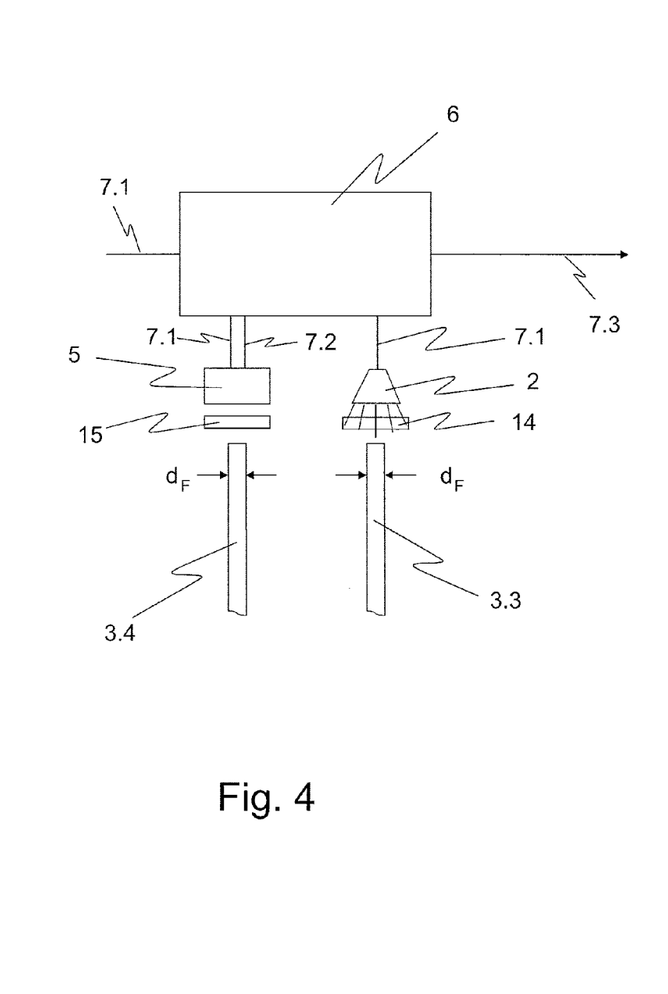
FIG. 4 shows a schematic view of an operation of an extract of FIG. 2.
Figure 5:
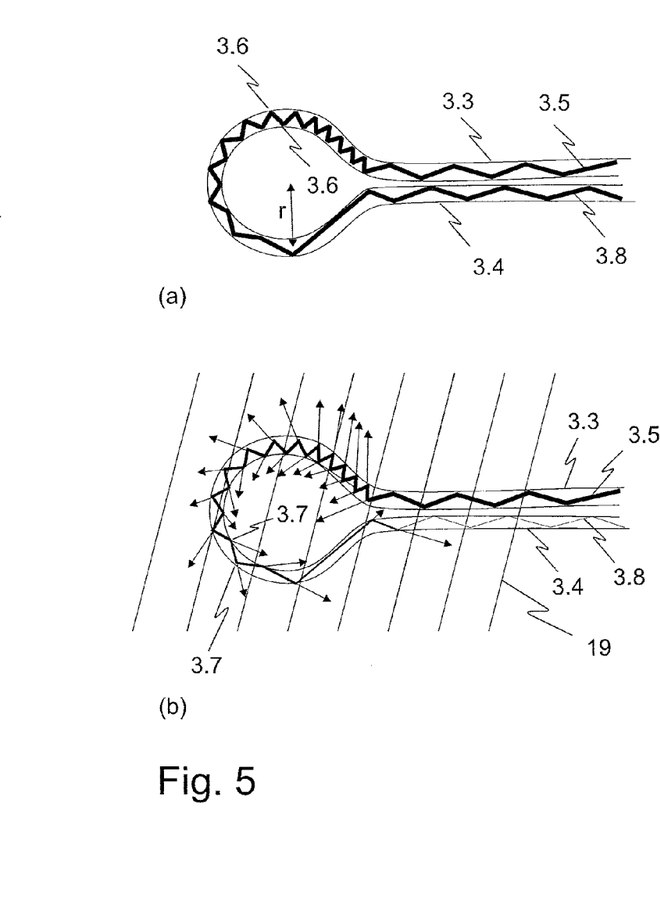
FIG. 5a, 5b show schematic views of operational modes of different optical fibers of the optical liquid level sensor according to the invention.

According to FIG. 4, the light source 2 of the optical liquid level sensor 1 illuminates homogenously the transparent output window 14 supplying the input side 3.3 with diameter $d_F$ of the optical fiber 3 with light. The light source 2, the CCD Unit 5 and the processing unit 6 are powered by power lines 7.1. Signals from the output side 3.4 with diameter $d_F$ of the optical fiber 3 pass through the transparent input window 15, are sensed by the CCD unit 5 and are transmitted via the signal line 7.2 to the processing unit 6 for interpretation. The information regarding liquid level interpreted by the processing unit 6 is communicated via an information line 7.3.

According to FIG. 5a, light 3.5 is transmitted through the input side 3.3 of the optical fiber 3 towards a sensor head of optical fiber 3. The sensor head forms a turn with a radius r. The sensor head is in air/gas. The sensor head is designed by an appropriate selection of material for the fiber 3, the frequency or frequency spectrum of the light, and the turn radius r in such a way, that the light is to a very high amount kept inside the fiber 3 because of total reflection 3.6 of the light inside the fiber 3 if the fiber 3 is outside the liquid. The radius r is reduced to a minimum $r_{min}$, still returning a high throughput of light 3.8 through the output side 3.4 of the fiber 3 for still enough intensity I above the critical intensity $I_c$ at the output side 3.4 of fiber 3 to the transparent input window 15.

On FIG. 5b, if the fiber 3 is submerged in the liquid below the liquid level 19 of the tank/container 9, the light 3.5 inside the fiber 3 is subject to a high degree of refraction 3.7 due to the physical behavior of the optical fiber sensor head. The refraction 3.7 results in a loss of light intensity I from the fiber 3 into the liquid. The reduced light intensity I in the return path 3.8 inside the output side 3.4 of the fiber 3 is lower than the critical intensity $I_c$.

Figure 6:
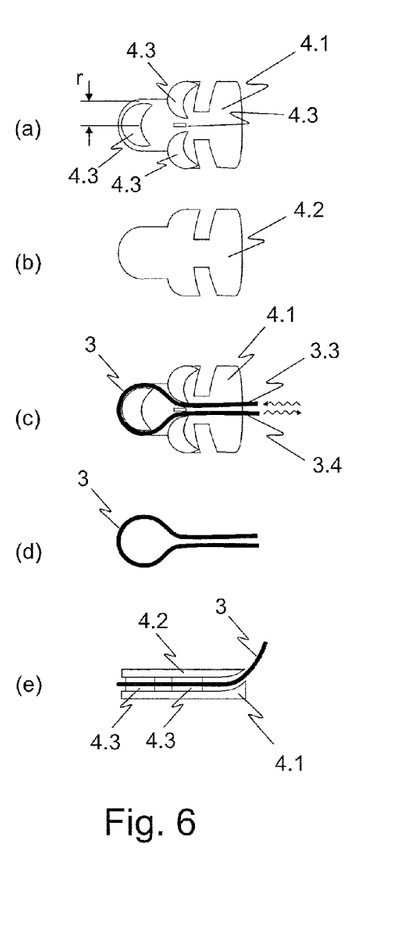
FIGS. 6 to 10 show schematic views for the support and guidance element of the optical liquid level sensor according to the invention, FIG. 10 showing an example of "star-shaped" guideways.

According to FIG. 6 a support and guidance element 4 comprises a profiled lower section 4.1 with guideways 4.3 and an upper section 4.2 to be fixed onto the lower section 4.1 after insertion of the fiber 3 along the guideways 4.3. FIG. 6a shows the lower section 4.1 of the support and guidance element 4 with four guideways 4.3 for the fiber 3 which allow for a turn radius r of the sensor head. FIG. 6b shows the corresponding upper section 4.2 of the support and guidance element 4 in top view. The upper section 4.2 can be glued or fixed with other well-known techniques to the lower section 4.1 after insertion of the fiber 3 with its respective input side 3.3 of the fiber 3 and output side 3.4 of the fiber 3 along the four guideways 4.3 as shown in FIG. 6c. FIG. 6d shows a top view of the fiber 3 with the sensor head resulting from insertion of the fiber 3 into the support and guidance element 4. FIG. 6e is a lateral view of the support and guidance element 4 with inserted fiber 3, the fixed section 4.2 on top of section 4.1 and the guideways 4.3.

Figure 7:
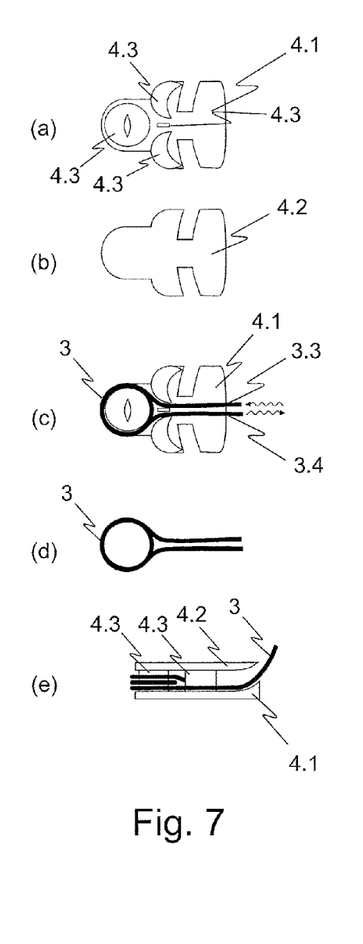

According to FIG. 7, an alternative support and guidance element 4 comprises the lower section 4.1 with modified guideways 4.3 for several turns to form the sensor head of the fiber 3.

Figure 8:
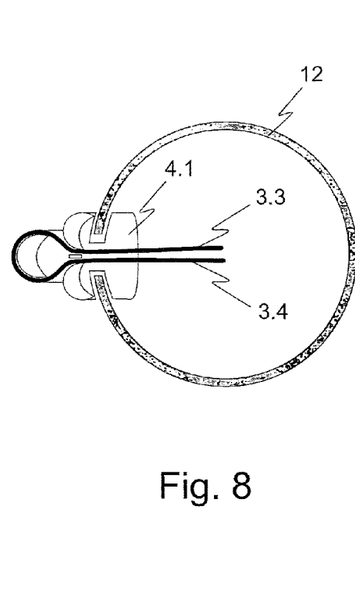

According to FIG. 8, the support and guidance element 4.1 with the inserted fiber 3 is mounted into a radial aperture of the sensor tube 12 with the sensor head of fiber 3 radial outside this aperture and the input side 3.3 of the fiber 3 and the output side 3.4 of the fiber 3 radial inside the sensor tube 12. The upper part 4.2 of the support and guidance element 4 has not yet been fixed to the lower part 4.1.

According to FIG. 9a, a lower part 4.1 of a further alternative support and guidance element 4 is provided with seventeen turns formed as bending sections around eight inner plus nine outer guideways 4.3 plus two guideways 4.3 at the interface of the further alternative support and guidance element 4 with the radial aperture of the sensor tube 12 for guidance of the input side 3.3 of the fiber 3 and the output side 3.4 of the fiber 3 radial inside the sensor tube 12. The further alternative support and guidance element 4 is provided with seven radial spacers 4.4 for positioning of the further alternative support and guidance element 4 relative to the sensor tube 12. FIG. 9b shows the corresponding upper part 4.2 to be glued or fixed to the lower part 4.1 after mounting of the fiber 3.

According to FIG. 10a, the lower part 4.1 of the support and guidance element 4 with an already mounted optical fiber 3 with input side 3.3 and output side 3.4, respectively are completely mounted inside a sensor tube 12.1 executed as a screen, thus forming a caging basket 12.2 in order to allow the liquid to flow easily into and out of the sensor tube 12.1. Radial spacers 4.4 regularly radial distributed at least on three positions of each support and guidance element 4 provide for centering of the respective support and guidance elements 4 inside the caging basket 12.2. FIG. 10b shows the corresponding upper part 4.2 with radial spacers 4.4 to be glued or fixed to the lower part 4.1 into which the fiber 3 has been mounted.

Figure 9:
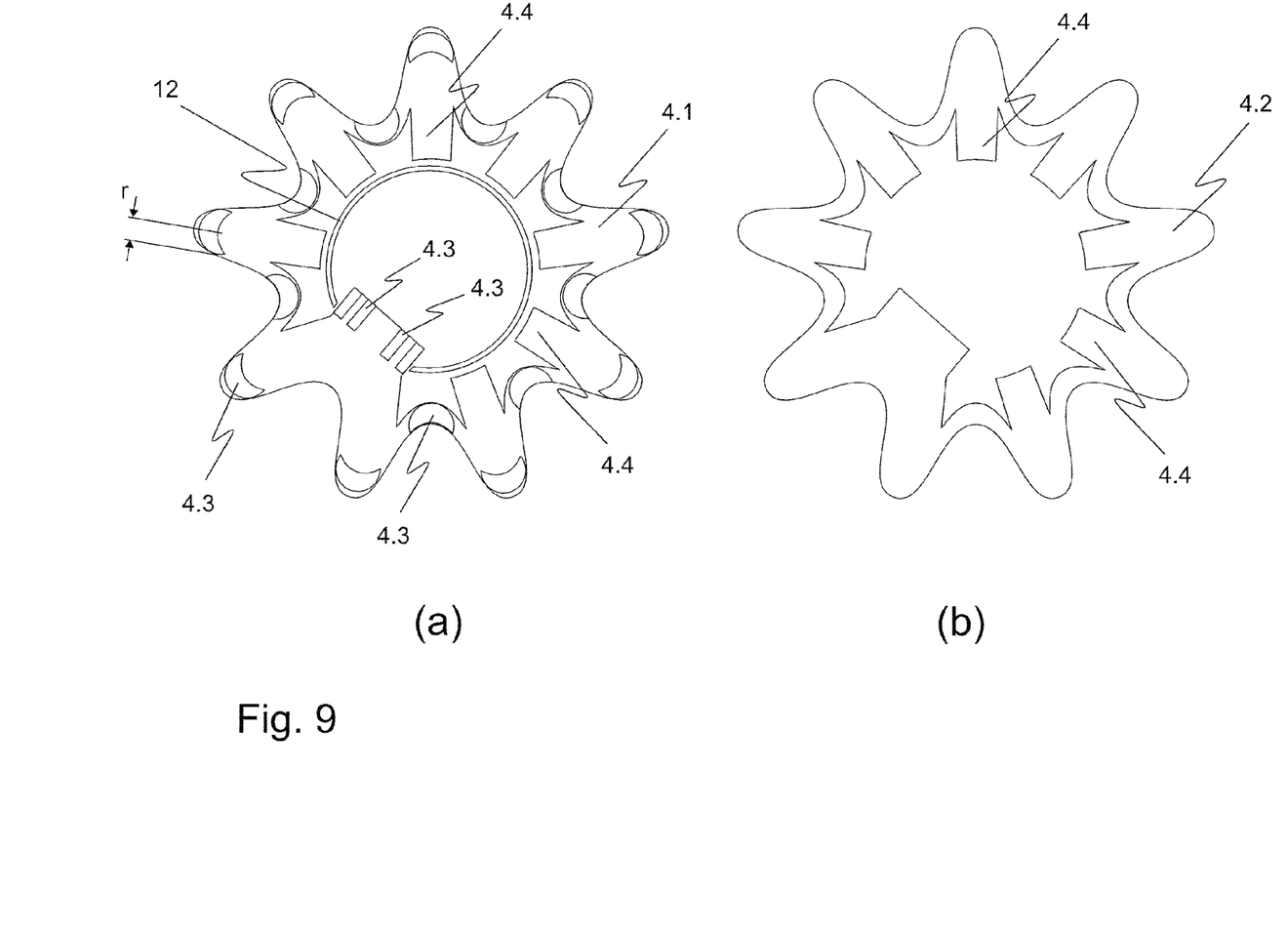
Figure 10:
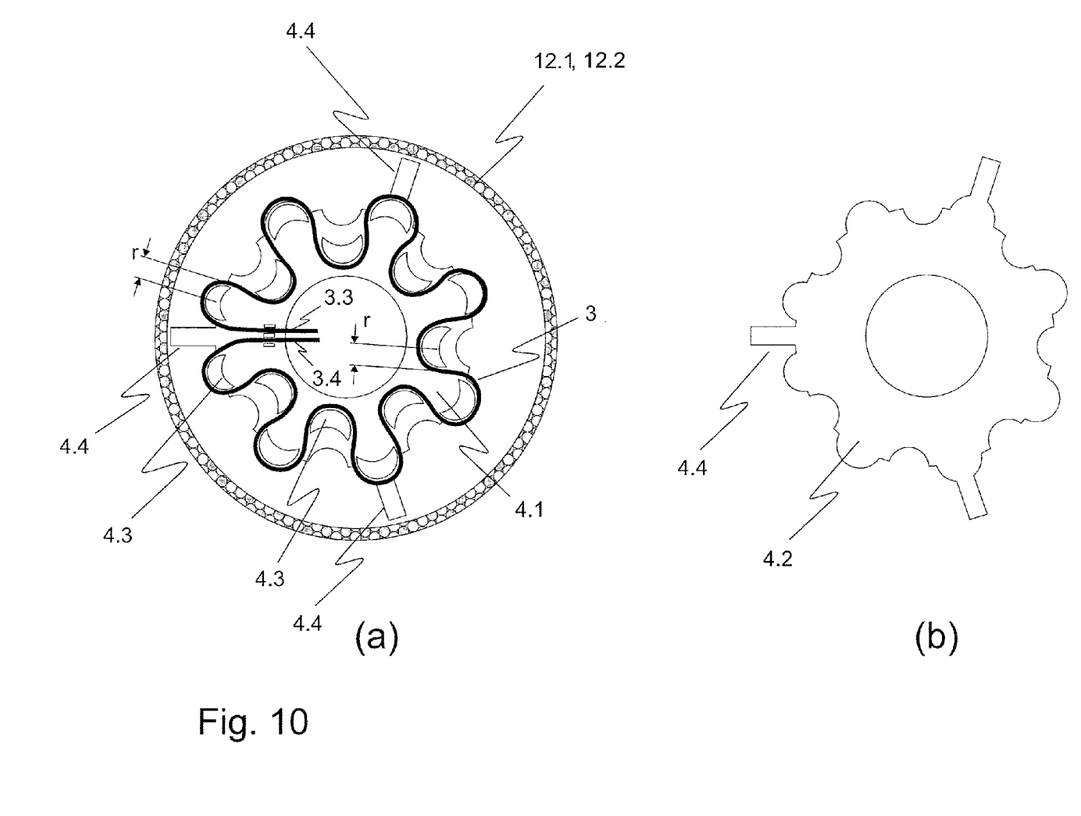

From FIGS. 9 and 10, the show schematic upper planar views show the support and guidance elements 4 of the optical liquid level sensor 1 according to the invention, with "star-shaped" guideways (4.3). Radial spacers 4.4 are regularly distributed radially at least on three positions with the corresponding support and guidance elements (4).

LIST OF NUMERAL REFERENCES IN THE DRAWINGS

1 Optical Liquid Level Sensor
2 Homogeneous Planar Light Source/Light Feed by Pillar of Lamps
3 Polymeric or Glass Optical Fiber with diameter $d_F$
3.1 Spot on Transparent Window 15 with Light Intensity $I>=I_C$
3.2 Spot on Transparent Window 15 with Light Intensity $I<I_C$
3.3 Optical Fiber Segment for Injecting Light
3.4 Optical Fiber Segment for Returning Light
3.5 Injected Light Ray
3.6 Point of Total Reflection inside the Optical Fiber
3.7 Point of Partial Reflection and Partial Refraction
3.8 Reverberatory Light Ray
4 Support and Guidance Element made of Metal or Plastics
4.1 Lower Part of the Support and Guidance Element
4.2 Upper Part of the Support and Guidance Element
4.3 Guideways for the Optical Fiber, e.g. "star-shaped" guideways
4.4 Radial Spacer
5 CCD Unit for Sensing the Received Light Pattern
6 Processing Unit
7 Combined Power and Signal Line
7.1 Power Line
7.2 Signal Line
7.3 Information Line
8 Sensor Electronics (including Light Source and CCD Unit)
8.1 Sealed Housing for the Sensor Electronics
9 Ceiling of the Liquid Container
9.1 Sealing Element for the Mounting of the Complete Sensor Unit onto the Liquid Container 9
10 Screws or Rivet for Mounting the Electronics Housing 8 to the Sensor Tube 12 with the Lower Sensor Elements
11 Screw for Mounting the Complete Sensor Unit onto the Liquid Container 9
12 Sensor Tube
12.1 Screen as Sensor Tube
12.2 Caging Basket
13 Helical Spring for Tightening the Support and Guidance Elements 4 and the Spacing Means 18
14 Sealed Transparent output window of the Housing of the Sensor Electronics
15 Sealed Transparent input window of the Housing of the Sensor Electronics, eventually realized as an Optical Filter
16 Holding Means/Mounting System for the Optical Fibers 3
17 Optical Fiber for Light Quality and Light Level Reference
17.1 Input Spot for the Light Quality and Light Level Reference
17.2 Measurement Spot for the Light Quality and Light Level Reference
18 Spacing Means to Guarantee the Intended Sensing Scale of the Liquid Level Sensor
19 Liquid Level to be Sensed

What is claimed is:

1. An optical level sensor for detection of a current liquid level inside a tank, the sensor being mounted to the tank, the sensor comprising: a light source, a light detector with a processing unit, and optical fibers, the optical fibers comprising each at least one input side, assigned to the light source and reaching from the light source into the tank, and at least one output side, assigned to the processing unit via the light detector and reaching from inside the container or tank to the light detector, wherein the optical level sensor also includes:
    mounting means for mounting the sensor to a ceiling of the tank; and
    a sensor tube attached to the tank and having a housing sealed by sealing means to the tank above the liquid level and a bottom surface below the liquid level;
    the sensor tube being provided with support and guidance elements extending with at least three radially distributed positions inside the tank and which collect support and guide optical fibers to different heights of the tank, with each optical fiber having a number of input sides and a number of turns forming sensor heads between two input sides, for a different level; each optical fiber being guided in its half-length through a corresponding support and guidance element, with the corresponding support and guidance element bending the fiber in turns forming the sensor heads of a small radius r around at least one corresponding guideway of the corresponding support and guidance element.

2. An optical level sensor according to claim 1, wherein the number of optical fibers is chosen with at least: 50, 100, 1000 optical fibers provided for sensing different liquid levels.

3. An optical level sensor according to claim 1, wherein a material of the optical fibers is glass or plastic and the optical fibers have a diameter between 0.1 mm and 1.0 mm.

4. An optical level sensor according to claim 1, wherein a material of the support and guidance elements is plastic or metal.

5. An optical level sensor according to claim 1, wherein at least 50, 100, 1000 sensor heads are assembled in order to allow for detection of at least 50, 100, 1000 different liquid levels.

6. An optical level sensor according to claim 1, wherein a reference fiber is provided as a reference for the light intensity from a fiber which is in air exclusively.

7. An optical level sensor according to claim 1, wherein a spacing element is provided between the support and guidance elements and a spiral spring is provided in the sensor tube so that the radial elements and spacing elements are compressed with the spiral spring.

8. An optical level sensor according to claim 1, wherein the turns forming sensor heads of optical fibers are arranged outside the fiber collecting sensor tube.

9. An optical level sensor according to claim 1, wherein the sensor tube is in the form of a caging basket, and the support and guidance elements with the fibers are completely inside the caging basket.

10. An optical level sensor according to claim 1, wherein the sealing means between the housing and the tank include at least one transparent window forming an optical filter.

11. An aircraft having a tank for gas and the tank having at least one optical level sensor according to claim 1, wherein the aircraft is a rotary wing aircraft having onboard sensing electronics connected to the optical level sensor for determining an exact current level of liquid inside the tank in a consuming process of liquid by the rotary wing aircraft.

12. An optical level sensor according to claim 2, wherein the input side of the optical fibers and the output sides of the optical fibers are collected in groups respectively.

13. An optical level sensor according to claim 12, wherein a collection of input sides of groups of optical fibers is fed collectively by a homogeneous planar light source.

14. An optical level sensor according to claim 12, wherein a collection of output sides of groups of optical fibers are sensed collectively by a Charged Coupled Device (CCD) as light detector.

15. An optical level sensor according to claim 10, wherein the sealing means extend between the inside of the tank and at least one light source, light detector and processing unit, so that at least one transparent window is forming at least one of: a sealed transparent output window for optically filtering light from the light source and a sealed transparent input window for optically filtering light to the light detector.

16. An optical level sensor for detection of a current liquid level inside a tank, the sensor comprising:
- a light source;
- a light detector with a processing unit;
- a plurality of optical fibers, each having at least one input side assigned to the light source and at least one output side assigned to the processing unit via the light detector;
- a housing with a top surface and a bottom surface, the housing being configured to couple to an interior of a tank with the top surface above a liquid level and the bottom surface below a liquid level; and
- a plurality of guide members cooperating with the housing and being arranged to support and guide the plurality of optical fibers to different heights relative to the housing, each respective fiber of the plurality of optical fibers being arranged about respective members of the plurality of guide members to form a plurality of turns to define sensor heads.

17. The optical level sensor of claim 16, wherein a respective fiber of the plurality of optical fibers is arranged about respective members of the plurality of members to form a plurality of turns to define a plurality of sensor heads.

18. The optical level sensor of claim 16, wherein respective members of the plurality of guide members extend radially relative to the housing at three distributed positions.

19. A rotorcraft comprising:
- a fuel tank having an interior with an upper surface;
- an optical level sensor having a housing with a top surface, a bottom surface, and a central axis extending from the top surface to the bottom surface, a light source, a light detector with a first processing unit, a plurality of optical fibers, each having at least one input side assigned to the light source and at least one output side assigned to the first processing unit via the light detector, and a plurality of guide members cooperating with the housing and being arranged to support and guide the plurality of optical fibers in different sensor planes, each sensor plane extending generally orthogonal to the central axis of the housing, each respective fiber of the plurality of optical fibers being arranged about respective members of the plurality of guide members to form a plurality of turns to define sensor heads in a respective sensor plane; and
- a mount coupling the top surface of the housing to the upper surface of the interior of the fuel tank.

20. The rotorcraft of claim 19, wherein a respective fiber of the plurality of optical fibers is arranged about respective members of the plurality of guide members to form a plurality of turns to define a plurality of sensor heads.

* * * * *